United States Patent [19]
Norden

[11] 4,064,964
[45] Dec. 27, 1977

[54] SEISMIC SIGNAL GENERATING APPARATUS

[76] Inventor: John A. E. Norden, 709 Normandie Drive, Norman, Okla. 73069

[21] Appl. No.: 704,174

[22] Filed: July 12, 1976

[51] Int. Cl.² .............................................. G01V 1/14
[52] U.S. Cl. .................... 181/114; 181/121; 173/119
[58] Field of Search ..................... 181/113, 114, 121; 340/17 R; 173/119; 404/133

[56] References Cited

U.S. PATENT DOCUMENTS

| | | | |
|---|---|---|---|
| 1,755,361 | 4/1930 | Pfluger et al. | 173/119 |
| 2,128,584 | 8/1938 | Haage | 173/119 |
| 2,897,907 | 8/1959 | Blount et al. | 181/114 |
| 2,927,773 | 3/1960 | Wilke | 173/119 |
| 3,193,046 | 7/1965 | Williams | 181/121 |
| 3,209,854 | 10/1965 | Williams | 181/121 |
| 3,393,763 | 7/1968 | Sundt | 181/114 |

Primary Examiner—Howard A. Birmiel
Attorney, Agent, or Firm—William R. Laney

[57] ABSTRACT

A seismic signal generating apparatus comprising a vehicle including a rearwardly extending bed, a ram-supporting framework pivotally mounted on the bed for pivotation about a horizontal axis, a ram slidably and reciprocably mounted in the framework, and a plurality of catapult springs connected between the framework, and one end of the ram for forceably reciprocating the ram from an elevated status in which the catapult springs are tensioned, to a lowered, impacting position in which the springs are tensioned to a lesser degree. A pair of superimposed metal plates are positioned below the ram on the ground for receiving the impact of the ram.

19 Claims, 10 Drawing Figures

SEISMIC SIGNAL GENERATING APPARATUS

BACKGROUND OF THE INVENTION

1. Field of the Invention

This invention relates to seismic wave generating devices utilized in seismic exploration, and more particularly, to seismic wave generators operating upon the ground impacting principle, and utilizing a ram which is driven into forceable contact with the earth, or with an intervening impact distribution structure, such as a metal plate.

2. Brief Description of the Prior Art

Many types of seismic wave generating devices previously utilized have included a seismic vibrator or sound generating device mounted on a vehicle, and including an elongated ram which is driven forceably against the earth to generate sound waves which are propagated into the ground for the purpose of developing a seismic profile based upon the detection of reflected waves which are returned to the surface from various subterranean formations. Various methods and apparatus have been employed for propelling the ram forceably against the earth. In some instances, a pneumatic or hydraulic drive is employed to force the ram from an elevated position to a lowered position in contact with the earth. In other types of apparatus, large compression springs are loaded in compression upon elevation of the ram by hydraulic or pneumatic means and, upon release of the ram, function to propel the ram forceably against the earth. Examples of such compression spring actuated ram-type seismic wave generators are those depicted and described in Williams, U.S. Pat. Nos. 3,193,046; 3,209,854 and 3,270,832. Compression spring actuated seismic wave generators of this type are characterized by a propensity for the ram to undergo some rebound after striking the earth, followed by a second less forceable impact. This develops undesirable secondary waves which interfere with the obtainment of the most reliable and accurate readout at the surface to provide meaningful information on the character of the various subterranean formations penetrated by the sound waves.

Many of the types of the earth-impacting seismic wave generating apparatus which have previously been used provide means for better distributing and directing the sound waves into the earth. In some instances, structures for accomplishing such distribution and direction have included a plate secured to the lower end of the ram, and having a substantial surface area, so that the area of the earth impacted upon descent of the ram is substantially larger than the diameter of the ram per se. In other instances, it has been proposed to direct the end of the ram against a metallic plate rested on the surface of the earth in alignment with the direction of the ram stroke. A disclosure of this type of structure appears in Kenney U.S. Pat. No. Re. 26,825. The three Williams patents previously referred to also include, generally, a steel anvil which is interpositioned between the compression spring reciprocated ram and the earth.

Some advantage has been thought to accrue from the use of a series of superimposed or nesting steel plates which are interconnected by chains, and which are permitted to fall by gravity to the earth so that, upon impact, the plates, in sequential fashion impact upon each other and come to assume the nested relationship. This multi-section or laminated weight plate structure is indicated by the patentee to provide an improved and optimized seismic wave of effective pulse shape and frequency.

BRIEF DESCRIPTION OF THE PRESENT INVENTION

The present invention is a seismic signal generating device which is relatively simple in construction, but which is very efficient and effective in developing an instantaneous, directional low frequency signal of excellent earth-penetrating capability.

Broadly described, the present invention comprises a vehicle having a rearwardly extending bed upon which a ram-supporting framework is mounted for pivotation about a horizontal axis. A ram is slidably and reciprocably supported by the framework, and means is provided for hydraulically elevating the ram when the framework is pivoted to a position in which the ram extends vertically. A plurality of catapult springs is connected between the framework and one end of the ram for undergoing tensioning when the ram is elevated. The springs function to forceably reciprocate the ram from an elevated status, in which the catapult springs are highly tensioned, to a lowered, impacting position in which the springs are tensioned to a lesser degree. Trigger means is provided for latching the ram in its elevated position after said hydraulic elevating means has elevated the ram, and has been released therefrom. A pair of superimposed metal plates are positioned below the ram on the ground for receiving the impact of the ram when it is reciprocated to its lowered, impacting position.

In a preferred embodiment of the invention, the seismic signal generating apparatus of the invention further includes a cradle assembly mounted on the forward portion of the bed of the vehicle and adapted for cradling and retaining a portion of the ram-supporting framework when the framework has been pivoted to an over-the-road or transport status. Hydraulic pivoting means is also provided, in a preferred embodiment of the invention, for pivoting the ram-supporting framework, and the ram carried thereby, from an operational position in which the ram extends vertically, to a transport position in which the framework is cradled or rested in the cradle assembly, and the ram, per se, is inclined at a relatively small acute angle to the horizontal.

An important object of the present invention is to provide an improved seismic signal generating apparatus which utilizes the force stored in springs in tension for driving a ram into impact with distributor plates positioned between the ram and the surface of the earth, and for preventing a rebound effect from occurring after the instant of impact by the ram against the plates.

An additional object of the invention is to provide a seismic signal generating apparatus for generating low frequency sound waves capable of achieving very deep penetration of the earth, and providing, concurrently with such penetration, reflected signals from which meaningful data and knowledge can be obtained as to the characteristics of the subterranean strata located at such depths.

An additional object of the present invention is to provide a self-contained, portable seismic signal generating apparatus which can be utilized in a majority of field locations without accessory equipment.

A further object of the invention is to provide a seismic signal generating apparatus which is relatively compact, is safe to use, is simple in its mechanical construction and is susceptible to use by operating personnel having relatively minimal skills in seismic exploration.

Another object of the present invention is to provide a seismic signal generating apparatus which, because of the manner in which it is constructed, eliminates secondary impaction resulting in the generation of a secondary seismic signal following the main impact of an impacting ram used for generating the main seismic signal.

Additional objects and advantages will become apparent from the following detailed description of a preferred embodiment of the invention when such description is read in conjunction with a perusal of the accompanying drawings which illustrate such preferred embodiment.

DETAILED DESCRIPTION OF A PREFERRED EMBODIMENT OF THE INVENTION

The seismic wave generating apparatus of the invention includes a flat bed truck 10 having a rearwardly extending bed 12 upon which is pivotally supported an impacting ram assembly designated generally by reference numeral 14. The impacting ram assemblly 14 includes a ram-supporting framework 16 upon which an elongated, generally cylindrical ram 18 is slidably mounted for reciprocating movement in an accommodating relief 19 formed in the rear end of the bed 12. The ram 18 projects through a central portion of a base plate 20 forming a portion of the framework 16. The framework 16 further includes a pair of vertically extending side plates 22 and 24 which are interconnected at their forward edges by a semi-cylindrical rear shield plate 26.

Figure 4:
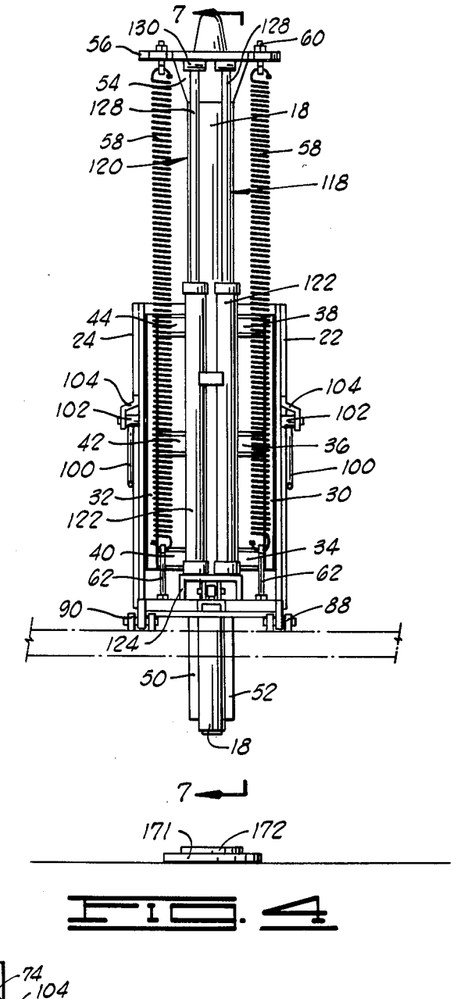
FIG. 4 is a rear elevation view of the ram and ram framework as the mechanism appears when viewed from a point just rearwardly of the cab of the vehicle on the supporting truck bed.
Figure 5:
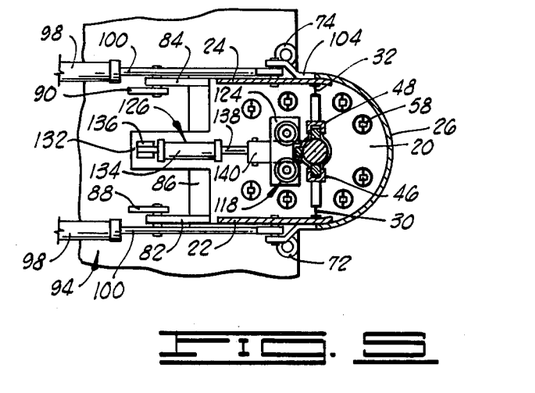
FIG. 5 is a sectional view taken along line 5—5 of FIG. 3.

Secured to the inner sides of the side plates 22 and 24 at a location near the rear edges thereof where these side plates are joined to the arcuate shield plate 26 are a pair of vertically extending I beams 30 and 32 (see FIGS. 4 and 5). The I beam 30 is secured to the outer ends of a plurality of transversely extending channel supporting members 34, 36 and 38 (see FIGS. 4 and 7), which channel supporting members are of I-shaped cross-section. In like manner, the vertically extending I beam 32 is secured to the outer ends of a plurality of transversely extending channel supporting members 40, 42 and 44 which are also of I-shaped cross-section. At their inner ends, the channel supporting members 34, 36 and 38 are secured to, and, along with the base plate 20, support, a vertically extending channel 46 of C-shaped cross-section. The channel supporting members 40, 42 and 44 are secured at their inner ends to a vertically extending channel 48 of C-shaped cross-section. The channels 46 and 48 are disposed on opposite sides of the ram 18, and function as tracks upon which tracking rods 50 and 52, welded or otherwise suitably secured to opposite sides of the ram 18, may track during the reciprocating movement of the ram 18 as hereinafter described.

Figure 8:
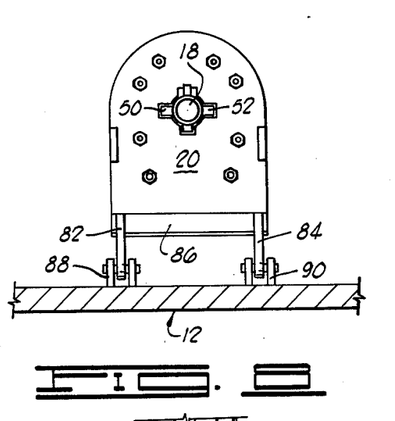
FIG. 8 is a bottom plan view of the ram and ram-supporting framework forming a portion of the seismic wave generating apparatus of the present invention.

At its upper end, the ram 18 is secured to an outwardly flaring hub 54 which is secured to the underside of an upper spring anchoring plate 56. A plurality of tension springs 58, which are eight in number, are arrayed around the ram 18 in circumferentially spaced relation to each other. Each of the springs 58 is connected at its upper end to an eye bolt 60 projected through the upper spring anchoring plate 56, and having the eye thereof facing downwardly from the under surface of this plate. The lower end of each of the springs 58 is connected to a suitable eye bolt 62 secured through the base plate 20 of the ram supporting framework 16 as best illustrated in FIGS. 4, 5 and 8.

Figure 9:
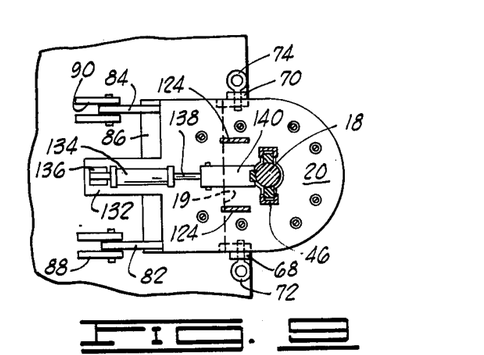
FIG. 9 is a sectional view taken along line 9—9 of FIG. 3.
Figure 10:
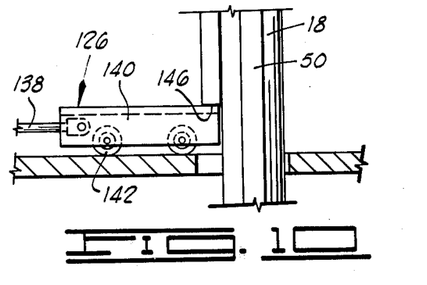
FIG. 10 is a detail view of a portion of the latching subassembly forming a part of the apparatus.

Welded or otherwise suitably secured to the lower side of the base plate 20 are a pair of latching plates 64 and 66. The latching plates 64 and 66 each contain apertures which, when the ram-supporting framework 16 is pivoted to the vertically extending position shown in FIGS. 3, 4, 6 and 7, are aligned with a pair of apertures formed in horizontally spaced retainer brackets 68 and 70. A pair of locking pins 72 and 74 are extended through the thus aligned apertures as shown in FIG. 9.

Projecting forwardly on the truck bed from the lower side of the ram-supporting framework 16, and specifically from the base plate 20 are a pair of horizontally spaced pivot links 82 and 84. The pivot links 82 and 84 are rigidly secured to a transverse reinforcing member 86 secured to the forward edge of the base plate 20, and are also secured alongside the outer edge of the base plate over a portion of its total length. The opposite ends of the pivot links 82 and 84 from the end secured to the ram-supporting framework 16 are pivotally connected to pairs of pivot brackets 88 and 90, respectively (see FIG. 8).

Figure 1:
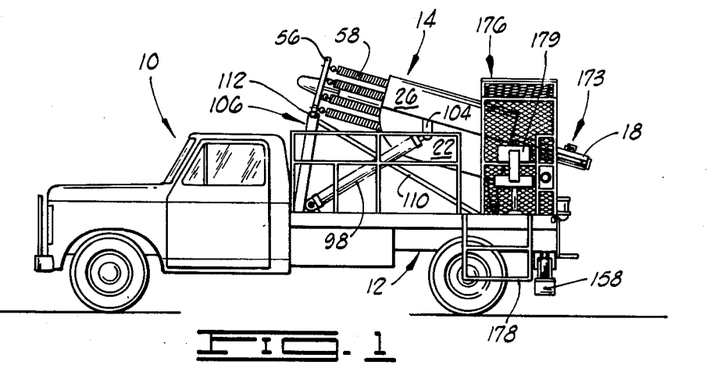
FIG. 1 is a side elevation view of a seismic wave generating apparatus constructed in accordance with the present invention.
Figure 2:
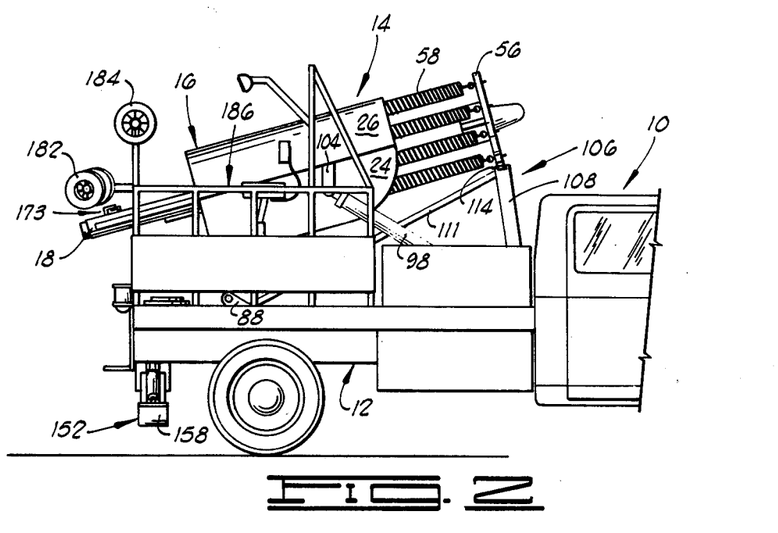
FIG. 2 is a view in elevation of the opposite side of the seismic wave generating apparatus of the invention from that side which is illustrated in FIG. 1.
Figure 3:
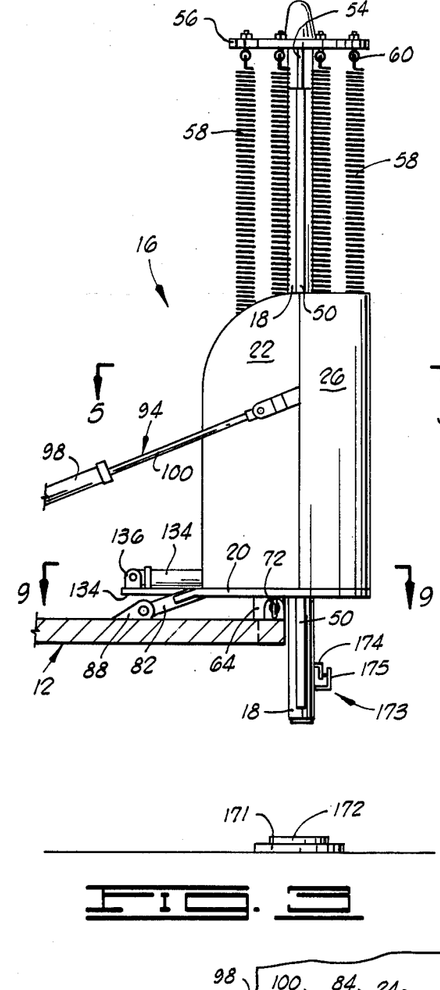
FIG. 3 is an enlarged detail view of the spring actuated ram and the framework in which it is mounted, as the ram appears in its elevated, cocked status.
Figure 6:
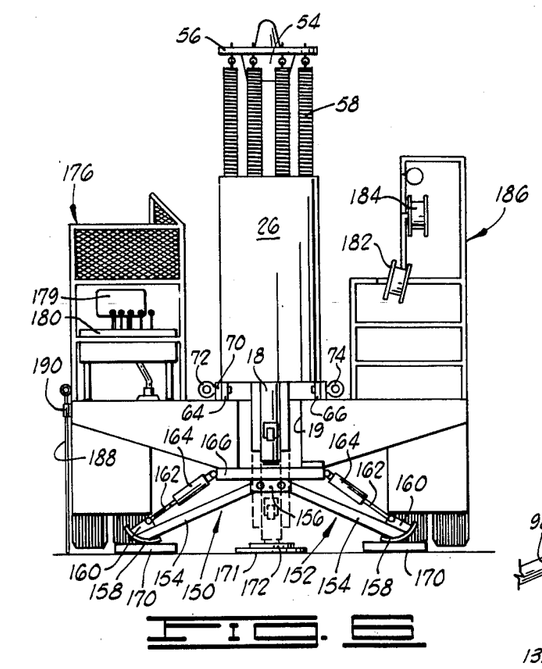
FIG. 6 is a rear elevation view of the seismic wave generating apparatus of the invention.
Figure 7:
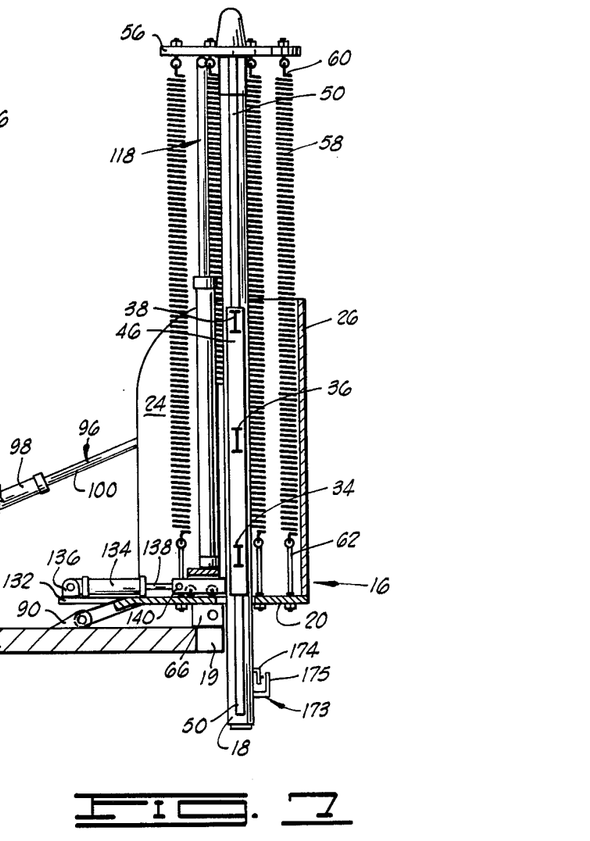
FIG. 7 is a sectional view taken along line 7—7 of FIG. 4.

For the purpose of pivotally swinging the ram-supporting framework 16 from a vertically extending operational position, as shown in FIGS. 3, 6 and 7 of the drawings, to an inclined transport position as shown in FIGS. 1 and 2, a pair of piston and cylinder subassemblies designated generally by reference numerals 94 and 96 are provided. The piston and cylinder subassemblies 94 and 96 are identical, and each includes an elongated cylinder 98 having a piston (not visible) reciprocably mounted therein and connected to one end of an elongated piston rod 100. The outer end of the piston rod 100 is pivotally connected through a hollow T fitting 102 to a bracket 104 secured to the outer side of the respective side plate 22 or 24. Stated differently, the piston and cylinder subassemblies 94 and 96 are connected to opposite sides of the ram-supporting framework 16 and, in operation, function to pivot the ram-supporting framework from the vertically extending operational position to the inclined over-the-road transport position shown in FIGS. 1 and 2.

Mounted in the central portion of the truck bed 12 just rearwardly of the cab is an upwardly extending cradle framework, designated generally by reference numeral 106. The cradle framework includes an upwardly extending A-frame 108 which is inclined slightly toward the rear of the truck in respect to the vertical, and is braced by a pair of elongated brace rods 110 and 111. At its upper end, the A-frame 108 carries a cradle defined by a pair of horizontally spaced, upwardly projecting plates 112 and 114. The cradle plates 112 and 114 are spaced so that the thickness of the upper spring anchoring plate 56 can be accommodated between these cradle plates when the ram-supporting framework 16 is pivoted into its over-the-road or transport position as shown in FIGS. 1 and 2.

For the purpose of elevating the ram to its cocked or ready position preparatory to executing a seismic shot, a pair of elevating piston and cylinder subassemblies 118 and 120 are provided. The elevating piston and cylinder subassemblies 118 and 120 are identical, and each includes an elongated hydraulic cylinder 122 which has its base mounted upon a supporting pedestal 124 secured to the upper side of the base plate 20 and straddling a ram latching subassembly 126 hereinafter described in detail. Each of the hydraulic piston and cylinder subassemblies 118 and 120 also includes an elongated piston rod 128 which carries a pushing T 130 at the free upper end thereof. Extension of the piston rods 128 from the cylinders 122 causes the pushing T's 130 to bear against the under side of the upper spring anchoring plate 56, and to thereby elevate the ram 18 against the resilient opposing bias exerted by the tension springs 58. As the piston rods 128 are extended and the ram 18 is elevated to its cocked position, the tension springs 58 are collectively highly tensioned and increasingly exert a downwardly acting force on the upper spring anchoring plate 56 and the ram 18 secured thereto.

The ram latching subassembly 126 includes a forwardly extending supporting plate 132 having a hydraulic cylinder 134 pivotally connected thereto through a pivot bracket 136 (see FIGS. 5 and 7). A piston rod 138 is extensible from and retractable into the hydraulic cylinder 134 and has its outer end connected to a latching block 140 which has rollers 142 rollably mounted on the lower side thereof, and which is positioned for reciprocation into a latching slot 146 formed in the forward side of the ram 18. When the piston rod 138 is extended, the latching block 140 is pushed rearwardly and will engage the latching recess 146 formed in the ram 18 at the time when the ram is in its cocked, vertically elevated position.

For the purpose of elevating the rear portion of the flat bed truck 10 off of the ground and preventing undesirable reaction by the pneumatic tires of the truck to the impact of the ram 18 at the time of generation of the seismic wave, a pair of hydraulic outrigger subassemblies 150 and 152 are provided. The hydraulic outrigger subassemblies 150 and 152 are identically constructed, and each includes an outwardly and downwardly projecting leg 154 which has its inner and upper end pivotally connected to a downwardly depending anchoring plate 156 secured to the underside of a chassis structure beneath the bed 12 of the truck 10. Each leg 154 carried at its outer end, an arcuate support shoe 158 which has secured to the upper facing concave side thereof, a plate 160 which is pivotally connected to the outer free end of a piston rod 162. The piston rod 162 is reciprocable in a hydraulic cylinder 164 which is pivotally connected at its base or upper end to a transversely extending bed plate 166 secured on the underside of the bed 12 of the truck 10. A pair of wooden support blocks 170 of identical construction are, during use of the hydraulic outrigger subassemblies 150 and 152, placed beneath the support shoes 158 and support these shoes in spaced relation to the ground.

During the operation of the seismic signal generating apparatus in the manner hereinafter described, the piston rods 162 are hydraulically extended from their respective cylinders 164 to cause the outwardly and downwardly extending legs 154 in each of the hydraulic outrigger subassemblies 150 and 152 to be projected downwardly until they contact the wooden blocks 170. At this time, continued extension of the piston rods 162 causes the rear end of the vehicle 10 to be elevated so that the weight of the vehicle is removed from the pneumatic tires at the rear end thereof and, in fact, these tires are lifted clear of the earth.

A pair of circular steel striking plates or disks which include a relatively large diameter lower plate 171 and a relatively smaller diameter upper plate 172 are positioned in concentric, superimposed position on the ground directly below the ram.

For the purpose of supporting an inertia switch housing (not shown) on the ram 18 in a position to cause closure of an inertia switch at the instant the ram impacts the striking plates 171 and 172, a switch retainer bracket 173 is provided on the rear side of the ram and includes an L-shaped mounting plate 174 and an L-shaped rear retainer plate 175 between which the inertia switch housing is located and secured by suitable special fasteners (not shown). With the switch box thus located, an inertia switch located in the box is caused to momentarily close at the time that the ram 18 is suddenly arrested in its downward movement by contact with the lower end thereof with the upper plate 172. Closure of the inertia switch provides a zero point or base spike upon the readout chart indicative of the time at which impact occurs, and at which the seismic signal is generated and propagated into the earth.

On the right side of the vehicle as it is viewed from the rear end (as shown in FIG. 6), a pair of electrical cable reels 182 and 184 are rotatably supported upon a reel supporting framework designated generally by reference numeral 186. The cable reels 182 and 184 function to support electrical cables which can be extended to an instrument vehicle parked some distance from the seismic signal generating apparatus, and containing instrumentation for detecting and providing a graphic readout or strip chart log portraying the reflected sound signals returned from subterranean formations after impingement thereagainst of the downwardly directed seismic wave generated by the apparatus of the invention.

As a quick and substantially sufficient method for determining that extent of elevation of the rear end of the vehicle 10 by means of the hydraulic outrigger subassemblies 150 and 152 which will bring the hydraulic ram 18 into substantially precise verticality, a gauging rod 188 is provided, and during operation of the apparatus, is slidably extended through a sleeve 190 welded or otherwise suitably secured to one of the side plates of the bed 12. When the gauging rod 188 has moved downwardly through the sleeve 190 until the eye at the top of this rod comes in contact with the top of the sleeve, the ram 18 is then in a substantially vertical position, and is ready to be cocked or elevated to its loaded position preparatory to delivering a stroke directly downwardly against the pair of superimposed striking plates 171 and 172 as hereinafter described.

OPERATION

In the operation of the seismic signal generating apparatus, the truck 10 is driven to the location where it is desired to make a seismic investigation of the geology of a subterranean situs. At this location, the truck is positioned so that the rear end thereof is preferably located over a relatively level and firm stretch of terrain. The brakes of the truck are set, and the hydraulic piston and cylinder subassemblies 94 and 96 are then actuated by an operator sitting at the operator's seat 179, and operating the control console 180. As the piston and cylinder subassemblies 94 and 96 are energized, the piston rods 100 are extended to cause the ram-supporting framework 16 and the hydraulic ram 18 carried thereby to be pivoted about a horizontal axis which is coincident with the axis of the pivot pins extended through the pivot brackets 88 and 90, and through the respective horizontally spaced pivot links 82.

Prior to the time that the piston rods 100 have been fully extended to pivot the ram-supporting framework 16 into its vertically extending position, the elevating piston and cylinder subassemblies 118 and 120 are actuated from the control console 180 to extend the elongated piston rods 128 from the cylinders 122. This causes the pushing T's 130 to push against the upper spring anchoring plate 56 and force the ram 18 upwardly against the opposing tension of the tension springs 58. When the piston rods 128 have been fully extended from the cylinders 122, the springs 58 are highly tensioned and exert a downwardly acting force of large magnitude upon the ram 18 through the anchoring plate 56 and the hub 54.

After elevation of the ram 18 in the manner described, the extension of the piston rods 100 is continued until they reach the limit of their strokes, at which time the framework 16 is in its vertically extending position, and the ram 18 projects vertically at the rear end of the bed 12 of the truck 10. At this time, the lower portion of the ram 18 is partially positioned in the relief 19 formed in the rear end of the truck bed 12.

An operator next positions the striking plates 171 and 172 in superimposed relation to each other upon the surface of the ground directly below the ram 18. The smaller of the striking plates 172 is positioned concentrically upon the upper surface of the larger striking plate 171.

When the ram-supporting framework 16 is in its vertically extending position, it is locked in this position by extending the locking pins 72 and 74 through the aligned apertures in the latching plates 64 and 66 and the corresponding retainer brackets 68 and 70. In this position, the ram 18 will generally have passed through the vertical and will extend at a very slight angle to the vertical in a direction away from the rear end of the truck bed 12. This deviation from the vertical will be subsequently compensated by use of the hydraulic outrigger subassemblies 150 and 152 as hereinafter explained.

The operator next manipulates the appropriate controls on the control console 180 to energize the hydraulic cylinders 164 of the two hydraulic outrigger subassemblies 150 and 152. This causes the piston rods 162 to be extended from the cylinders 164 to force the outer ends of the projecting legs 154 downwardly. Prior to actuation of the hydraulic outrigger subassemblies 150 and 152, the wooden support blocks 170 have been placed in position on the surface of the ground immediately below the support shoes 158 so that, as the legs 154 are pivoted downwardly, the support shoes 158 come to bear against the upper surface of the wooden support blocks 170. Continued extension of the piston rods 162 forces the outer ends of the legs 154 further downwardly, and thus causes the rear end of the truck bed 12 to be lifted upwardly.

The gauging rod 188 is placed in position for sliding movement within the sleeve 190, and the lower end of the gauging rod is rested upon the earth. Actuation of the hydraulic outrigger subassemblies 150 and 152 is then continued, with concomitant elevation of the rear end of the truck bed 12, until the sleeve 190 touches the circular eye formed at the upper end of the gauging rod 188. At this time, under most circumstances, the ram 18 will extend truly vertical. Any needed final adjustment in the position of the striker plates 171 and 172 directly under the lower end of the ram 18 can now be accomplished.

Preparatory to initiating a "shot", the ram latching subassembly 126 is actuated so that the piston rod 138 is extended, and the latching block 140 is moved forward on the rollers 142 until the forward end of the latching block enters the latching slot 146 formed in the ram 18. A positive interlock is thus established between the latching block 140 and the ram 18 which prevents downward reciprocation of the ram. The elongated piston rods 128 of the elevating piston and cylinder subassemblies 118 and 120 are then retracted into the elongated hydraulic cylinders 122 so that all support for the ram 18 in its cocked position by these elevating piston and cylinder subassemblies is terminated. Only the ram latching subassembly 126 now retains the ram 18 in its elevated, cocked position.

At this time, or previously, the electrical cables carried on the reels 182 and 184 are extended to appropriate detecting and readout instrumentation which, in most instances, can be located in a second vehicle parked at some distance from the truck 10. The interconnections are made in a manner well understood in the art, and function to provide electrical and electronic circuitry functioning to detect and graphically record the reflected waves returned to the surface of the earth from subterranean formations following the propagation of the seismic signal into the earth by the use of the apparatus of the invention. There has also been placed in position on the rear side of the ram 18 at or prior to this time, an inertia switch assembly (not shown) which is fitted within said carried by the plates 174 and 175.

The generation of the seismic signal is then accomplished by the operator actuating the appropriate control at the control console 180 to retract the piston rod 138 into the hydraulic cylinder 134, thereby releasing the ram latching subassembly 126 from its interlock with the ram 18. This permits the highly tensioned springs 58 to catapult or propel the ram 18 directly downwardly so that the lower end of the ram impacts the striking plates 171 and 172.

At the instant when the lower end of the ram 18 contacts the upper surface of the upper striking plate 172, a low frequency seismic signal is generated, and is propagated directly downwardly into the earth below the striking plates. At this instant of initiation of the seismic signal, the inertia switch contained within the switch box (not shown) detachably mounted on the back side of the ram 18 is momentarily closed to provide a zero time signal which is incorporated in the time versus signal amplitude readout strip chart being recorded at the instrumentation truck, and ultimately providing a log showing the characteristics and locations of subterranean formations on the basis of the reflected sonic waves as the generated seismic signal traverses the earth in its downward course of travel.

An important object of the present invention is that feature thereof which entails the selection and use of tension springs 58 which have spring factors such that the springs remain tensioned to a significant degree after the ram 18 has been reciprocated downwardly against the striking plates 171 and 172 and has, at that point, stopped its downward travel. The residual tension remaining in the tension springs 58 at this time prevents all rebound of the ram 18, and thus obviates the generation of any secondary or tertiary signals as a result of "bouncing" of the ram upon the striking plates.

It has been observed and determined, in utilizing the seismic signal generating apparatus of the invention, that the signal generated is highly directional, and that the apparatus can be utilized with assurance that no damage to surrounding structures or subterranean formations, such as aquafers, will be cause or will result from the use of the apparatus. Moreover, the frequency and wave shape of the seismic signal generated by the apparatus appears to be such that the seismic wave has high penetrating capability. It has been observed, for example, that the seismic signal generated with the apparatus will penetrate thick, very dense granite formations and other subterranean strata which have a high sonic impedance characteristic, and which have resisted or prevented penetration of signals generated by other types of seismic signal generating apparatus now in use. Further, the seismic signals which are generated by the seismic signal generating apparatus of the invention are highly reproduceable, and it has been determined that multiple shots can be taken even at spaced locations over the same geological formations, and/or at widely separated time intervals, with excellent reproduceability characterizing the several sequential shots. Finally, an important advantage of the present invention is the capability of relatively rapid repetition of signal generation. Thus, it is possible to repeatedly take successive shots to provide accurate and meaningful data with successive shots being no more than three minutes from each other in time. This capability is in part due to the simplicity and ease of operation of the apparatus, and in part to the excellent reproduceability which has been observed to be characteristic of the signals generated.

Although a preferred embodiment of the invention has been herein described in order to illustrate the basic principles which underlie the invention, various changes in the illustrated and described structure can be effected without departure from such basic principles. Changes and innovations of this type are therefore deemed to be circumscribed by the spirit and scope of the invention, except as the same may be necessarily limited by the appended claims, or by reasonable equivalents thereof.

What is claimed is:

1. A seismic signal generating apparatus comprising:
   a vehicle including a rearwardly extending bed;
   a ram-supporting framework pivotally mounted on the bed for pivotation about a horizontal axis;
   a ram reciprocably mounted in the framework for vertical reciprocation in one position of the framework;
   a plurality of catapult tension springs connected between the framework and the upper end of the ram for forcibly reciprocating the ram from an elevated status in which the catapult springs are tensioned, to a lowered, impacting position in which the springs are tensioned to a lesser degree; and
   a pair of superimposed metallic striker plates positioned directly below the ram upon the ground.

2. A seismic signal generating apparatus comprising:
   supporting means;
   an elongated catapult ram having an upper end and a lower end and mounted on said supporting means for pivotation about a horizontal axis from a vertically extending position to an inclined position;
   hydraulic piston and cylinder means including vertically extensible pistons cooperating with the upper end of the ram for elevating the ram;
   a pair of superimposed steel plates positioned below said ram when the ram is in its elevated position and adapted to be impacted by said ram when said ram is reciprocated downwardly; and
   a plurality of tension springs connected between the upper end of said ram and said supporting means for resiliently opposing the elevation of said ram by said pistons as said springs are tensioned and resiliently opposing rebound of said ram after said ram has impacted upon said superimposed steel plates.

3. A seismic signal generating apparatus as defined in claim 2 and further characterized as including latching means for releasably latching said ram in its vertically extending position.

4. A seismic signal generating apparatus as defined in claim 2 and further characterized as including cradle means for receiving and supporting said ram in its inclined position.

5. A seismic signal generating apparatus comprising:
   a vehicle including a rearwardly extending bed;
   a ram-supporting framework pivotally mounted on the bed for pivotation about a horizontal axis;
   a ram reciprocably mounted in the framework for vertical reciprocation in one position of the framework, said ram-supporting framework comprising:
      a horizontally extending base plate having an opening therethrough through which said ram reciprocably extends;
      a pair of spaced, vertically extending side plates connected at their lower ends to said base plate and positioned on opposite sides of said ram;
      track channels secured to said side plates and positioned on opposite sides of said ram for guiding said ram during its reciprocating movement; and
   a plurality of catapult tension springs connected between the framework and the upper end of the ram for forcibly reciprocating the ram from an elevated status in which the catapult springs are tensioned, to a lowered, impacting position in which the springs are tensioned to a lesser degree.

6. A seismic signal generating apparatus as defined in claim 5 wherein said framework is further characterized as including a semi-cylindrical rear shield plate interconnecting opposed edges of said vertically extending side plates and secured at its lower end to said base plate, and shielding the rear side of said ram; and wherein said seismic signal generating apparatus is further characterized as including:

an upper spring anchoring plate having one end of each of said tension springs connected thereto;

a centrally flaring hub secured to the upper end of said ram and to one side of said upper spring anchoring plate; and a pair of tracking rods secured to opposite sides of said ram and extending parallel to the longitudinal axis of said ram, said tracking rods slidably registering with said track channels.

7. A seismic signal generating apparatus as defined in claim 6 and further characterized as including a cradle assembly mounted on said bed forward of said ram-supporting framework and including:

an upwardly extending A-frame; and a pair of horizontally spaced plates secured to the upper end of said A-frame and spaced to receive and support said one side of said upper spring anchoring plate when said framework is pivoted about said horizontal axis to a position in which said ram is inclined to the horizontal.

8. A seismic signal generating apparatus as defined in claim 7 and further characterized as including a ram latching subassembly for releasably latching the ram in an elevated status.

9. A seismic signal generating apparatus as defined in claim 8 and further characterized as including means for hydraulically elevating the ram against the tension of said catapult tension springs preparatory to reciprocating said ram downwardly to generate a seismic signal.

10. A seismic signal generating apparatus as defined in claim 9 and further characterized as including a pair of superimposed metallic striker plates of circular, disk shaped configuration positioned directly below the ram upon the ground for impacting thereupon by the ram when the ram is reciprocated downwardly by said tension springs.

11. A seismic signal generating apparatus as defined in claim 10 and further characterized as including outrigger means disposed beneath said bed at the rear end thereof and operative to selectively elevate the rear end of sand vehicle.

12. A seismic signal generting apparatus as defined in claim 11 wherein said outrigger means comprises a pair of hydraulic outrigger subassemblies positioned on opposite sides of said vehicle beneath the rear end portion of the bed and each including:

an outwardly and downwardly projecting leg having its inner and upper end pivotally connected to the underside of the bed for pivotation about a horizontal axis;

a support shoe secured to the outer, lower end of the leg; and a hydraulic piston and cylinder assembly connected to the leg for pivoting the leg upwardly and downwardly.

13. A seismic signal generating apparatus as defined in claim 12 and further characterized as including a ram latching subassembly for releasably latching the ram in an elevated status.

14. A seismic signal generating apparatus as defined in claim 13 wherein said ram latching subassembly comprises:

a hydraulic cylinder;

a latching block;

a supporting plate supporting said hydraulic cylinder and extending under said latching block;

wheels rollably supporting said latching block on said supporting plate; and a piston rod extensible from said hydraulic cylinder and connected to said latching block for rolling said latching block on said supporting plate and into latching engagement with said ram upon actuation of said cylinder.

15. A seismic signal generating apparatus comprising:

a vehicle including a rearwardly extending bed;

a ram-supporting framework pivotally mounted on the bed for pivotation about a horizontal axis;

a ram reciprocably mounted in the framework for vertical reciprocation in one position of the framework;

a plurality of catapult tension springs connected between the framework and the upper end of the ram for forcibly reciprocating the ram from an elevated status in which the catapult springs are tensioned, to a lowered, impacting position in which the springs are tensioned to a lesser degree;

a ram latching subassembly for releasably latching the ram in an elevated status, said ram latching subassembly comprising:

a hydraulic cylinder;

a latching block;

a supporting plate supporting said hydraulic cylinder and extending under said latching block;

wheels rollably supporting said latching block on said supporting plate; and a piston rod extensible from said hydraulic cylinder and connected to said latching block for rolling said latching block on said supporting plate and into latching engagement with said ram upon actuation of said cylinder.

16. A seismic signal generating apparatus comprising:

a vehicle including a rearwardly extending bed;

a ram-supporting framework pivotally mounted on the bed for pivotation about a horizontal axis;

a ram reciprocably mounted in the framework for vertical reciprocation in one position of the framework;

a plurality of catapult tension springs connected between the framework and the upper end of the ram for forcibly reciprocating the ram from an elevated status in which the catapult springs are tensioned, to a lowered, impacting position in which the springs are tensioned to a lesser degree;

outrigger means disposed beneath said bed at the rear end thereof and operative to selectively elevate the rear end of said vehicle, said outrigger means comprising a pair of hydraulic outrigger subassemblies positioned on opposite sides of said vehicle beneath the rear end portion of the bed and each including:

an outwardly and downwardly projecting leg having its inner and upper end pivotally connected to the under side of the bed for pivotation about a horizontal axis;

a support shoe secured to the outer, lower end of the leg; and a hydraulic piston and cylinder assembly connected to the leg for pivoting the leg upwardly and downwardly.

17. A seismic signal generating apparatus comprising:

a generally horizontally extending supporting structure;

a ram-supporting framework pivotally mounted on the supporting structure for pivotation about a horizontal axis;

a ram reciprocably mounted on the framework for vertical reciprocation in one position of the framework;

a plurality of catapult tension springs connected between the framework and the upper end of the ram for forcibly reciprocating the ram from an elevated status in which the catapult springs are tensioned, to a lowered, impacting position in which the springs are tensioned to a lesser degree; and a pair of superimposed metallic striker plates positioned directly below the ram upon the ground.

18. A seismic signal generating apparatus comprising:

a vehicle including a rearwardly extending bed;

a ram-supporting framework mounted on the bed and including:

a horizontally extending base plate having an opening therethrough through which said ram reciprocably extends;

a pair of spaced, vertically extending side plates connected at their lower ends to said base plate and positioned on opposite sides of said ram;

track channels secured to said side plates and positioned on opposite sides of said ram for guiding said ram during its reciprocating movement;

a ram reciprocably mounted in the framework for vertical reciprocation in one position of the framework; and a plurality of catapult tension springs connected between the horizontally extending base plate and the upper end of the ram for forcibly reciprocating the ram from an elevated status in which the catapult springs are tensioned, to a lowered, impacting position in which the springs are tensioned to a lesser degree.

19. A seismic signal generating apparatus comprising:

supporting means;

an elongated catapult ram having an upper end and a lower end and reciprocably mounted on said supporting means;

hydraulic piston and cylinder means including vertically extensible pistons cooperating with the upper end of the ram for elevating the ram in relation to the supporting means;

metal plate means positioned below said ram when the ram is in its elevated position and adapted to be impacted by said ram when said ram is reciprocated downwardly;

a plurality of tension springs connected between the upper end of said ram and said supporting means for resiliently opposing the elevation of said ram by said pistons as said springs are tensioned, and resiliently opposing rebound of said ram after said ram has impacted upon said steel plate means by the retention of residual tension in said tension springs at the time of impact;

a ram latching subassembly for releasably latching the ram in an elevated status preparatory to catapulting the ram against the steel plate means by the use of said tension springs, and after said extensible pistons are inactivated in their elevating cooperation with the upper end of the ram, said ram latching subassembly including:

a latching block adapted to latchingly engage said ram upon movement of said latching block; and a hydraulic cylinder for actuating said latching block to engage and disengage said latching block from said ram.

* * * * *